United States Patent [19]

Eshraghi

[11] Patent Number: 4,936,725
[45] Date of Patent: Jun. 26, 1990

[54] BLIND SHEAR-RING FASTENER AND METHOD

[75] Inventor: Soheil Eshraghi, Irvine, Calif.

[73] Assignee: Textron Inc., Providence, R.I.

[21] Appl. No.: 421,655

[22] Filed: Oct. 16, 1989

[51] Int. Cl.⁵ .................. F16B 13/04; B21K 1/44; B23P 19/02
[52] U.S. Cl. ...................... 411/43; 411/70; 10/27 R; 29/525.2
[58] Field of Search ............... 411/40, 43, 39, 70, 411/34–38, 69; 29/523, 525, 525.1, 525.2; 10/10 R, 27 R; 403/408.1

[56] References Cited

U.S. PATENT DOCUMENTS

| | | |
|---|---|---|
| 2,372,222 | 3/1945 | Mullgardt . |
| 3,148,578 | 9/1964 | Gapp . |
| 3,292,482 | 12/1966 | Fry et al. . |
| 3,302,510 | 2/1967 | Gapp . |
| 3,390,601 | 7/1968 | Summerlin . |
| 3,489,056 | 1/1970 | Blakeley . |
| 3,491,649 | 1/1970 | Smouton et al. . |
| 4,012,984 | 3/1977 | Matuschek . |
| 4,137,817 | 2/1979 | Siebol . |
| 4,143,580 | 3/1979 | Luhm . |
| 4,407,619 | 10/1983 | Siebol . |
| 4,765,787 | 8/1988 | Briles . |
| 4,810,142 | 3/1989 | Briles .................. 411/43 |

Primary Examiner—Neill R. Wilson
Attorney, Agent, or Firm—Knobbe, Martens, Olson Bear

[57] ABSTRACT

A blind fastener comprises a tubular sleeve, a mandrel stem and an integral shear ring and locking collar assembly. The integral shear ring and locking collar assembly has a wedge-shaped bulbing portion for expanding the blind side of the fastener sleeve in response to a pulling force on the stem, and a leading finger which functions as a locking collar. As the mandrel is pulled axially away from the sleeve, the leading finger portion radially expands the body of the fastener sleeve while the wedge-shaped portion axially compresses the tail end of the sleeve to form a blind head. After forming the blind head, the wedge-shaped bulbing portion shears. The leading finger continues travelling through the fastener sleeve, radially expanding the sleeve to fill the hole between the sleeve and the workpiece. When the leading finger meets with an anvil washer it buckles into a recess formed in the sleeve so as to interlock the sleeve and the mandrel stem.

14 Claims, 1 Drawing Sheet

BLIND SHEAR-RING FASTENER AND METHOD

BACKGROUND OF THE INVENTION

The present invention relates generally to blind fasteners. More specifically, the present invention relates to a blind fastener having an improved arrangement for a shear ring providing a locking collar.

Typical blind fasteners, which are commonly used to fasten components in which only one side of the workpiece is accessible, generally comprise four essential elements: a mandrel, a tubular sleeve surrounding the mandrel, a shear ring for upsetting the sleeve to form a blind head and a locking collar. In operation, the mandrel and its surrounding tubular sleeve is inserted through a hole in the components to be fastened together. An installation tool is used to pull the mandrel axially away from the workpieces, while simultaneously bearing down on the tubular sleeve. During such pulling, the shear ring axially compresses the sleeve, causing it to bulb and form a blind head. Continued pull on the mandrel forces the locking ring into a recess in the sleeve so as to lock the mandrel and the sleeve together. As a final step, the serrated end of the mandrel breaks away to complete installation of the fastener.

Summerlin, in U.S. Pat. No. 3,390,601, describes a blind fastening device comprising a tubular rivet body, a mandrel having an upsetting head adapted to be drawn into the tail end of the rivet to expand the rivet body and form a blind head, and a separate shearable member. The shearable member comprises a main portion which has an easy clearance fit over the upsetting head, and an inwardly tapered portion which converges over, and is closely fit around the mandrel stem to facilitate entry into the rivet body. As the mandrel stem and the shear ring are drawn into the fastener body, the shear ring enlarges the fastener body tail when force is applied to the stem to form the blind head. Then, as the stem is further drawn into the fastener, the tapered portion of the shear ring shears and continues to advance within the fastener body until it reaches an internal shoulder therein. As a final step, a locking collar, threaded over the mandrel stem, is forced into the head of the fastener and the stem is broken away.

Matuschek, in U.S. Pat. No. 4,012,984 describes a blind rivet assembly with a locking collar assembled on the rivet stem, within the rivet body. The rivet stem extends through the rivet body and has a pulling portion which can be gripped by a conventional rivet tool. The tail end of the stem has a tail former for expanding the tail end of the rivet body into an enlarged tail so as to secure the superposed plates together. An annular locking groove is provided around the stem, at a distance from the tail former, so that when the workpieces are riveted together, the locking groove is still within the rivet body. A recess is provided near the head of the rivet body so that when the skirt of the locking collar abuts against the driving anvil the force of pull exerted on the stem causes the locking collar to bulge outwardly so as to interlock the stem and the rivet body.

Shear rings integrally formed with the mandrel stem suffer from many manufacturing disadvantages. In order to form a shear ring integral with the stem, one must first begin with a piece of material having a diameter at least equal to the desired size of the shear ring. The stem material must then be machined using cutting tools to form the shear ring, a process which is not only time consuming, but also produces a large amount of scrap, or wasted material. In addition to the difficulties associated with the actual formation of the integral shear ring, there are also problems associated with tool wear. As the cutting tools become dull and worn, slight variations in the dimensions of the shear ring tend to appear. This is undesirable in that such variations make the fastener somewhat less reliable because the forces required to bulb the sleeve and shear the shear ring are less predictable. Thus, frequent tool sharpening or tool replacement is needed.

Because the shear ring of a blind fastener is designed to shear at a predetermined force after forming the blind head, limitations are necessarily imposed on the axial width of the shear ring, and thus accuracy of machining is important. Prior integral shear rings have been manufactured with an included angle at the base of the shear ring, proximate the mandrel stem. This included angle portion of the shear ring presents a cutting surface on the leading edge of the shear ring. Forming the shear ring having an included angle proximate the stem creates an undercut portion along the leading edge and presents forming difficulties. In operation, this type of shear ring first gouges the tail end of the sleeve so as to create a wedge therein. This wedge facilitates bulbing of the sleeve. After forming a blind head, the shear ring is sheared from the stem. Such an operation requires a large initial pulling force, and thins the walls of the tail end of the sleeve.

SUMMARY OF THE INVENTION

The present invention improves upon the above-mentioned fasteners by providing a blind fastener characterized by an integral shear ring and locking collar assembly. The integral shear ring and locking collar assembly has a wedge-shaped bulbing portion for expanding the blind side of the fastener sleeve in response to a pulling force on the stem, and a leading annular edge which functions as a locking collar. Advantageously, the integral shear ring and locking collar assembly simultaneously expands the fastener sleeve while forming the blind head. After forming the blind head, the wedge-shaped bulbing portion shears and the leading annular edge, or locking collar portion of the shaped wire continues travelling through the fastener sleeve radially expanding the sleeve to fill the hole between the sleeve and the workpiece. When the leading annular edge meets with an anvil washer it buckles into a recess formed in the sleeve so as to interlock the sleeve and the mandrel stem.

The combined shear ring and locking collar is relatively simple in its configuration, and can be formed of shaped wire, suitable for wrapping about the mandrel stem. Because the combined shear ring and locking collar assembly can be formed of shaped wire, it can be wrapped around the mandrel stem rather than machined out of a larger piece of material, as would an integral shear ring fastener assembly. This is significant in that it allows more design flexibility as the shear ring and locking collar assembly can be formed of various types and strengths of materials, depending on the particular application. In addition, the costs associated with manufacturing such a blind fastener are reduced, as it is not necessary to machine a shear ring integral with the stem. Further, the wedge-shaped bulbing portion of the shear ring and locking collar assembly facilitates the ease of formation of the blind head.

BRIEF DESCRIPTION OF THE DRAWINGS

Further objects, features and other advantages of the present invention will become readily apparent from the ensuing detailed description, when considered with the appended drawings in which.

DETAILED DESCRIPTION OF THE PREFERRED EMBODIMENT

Figure 1:
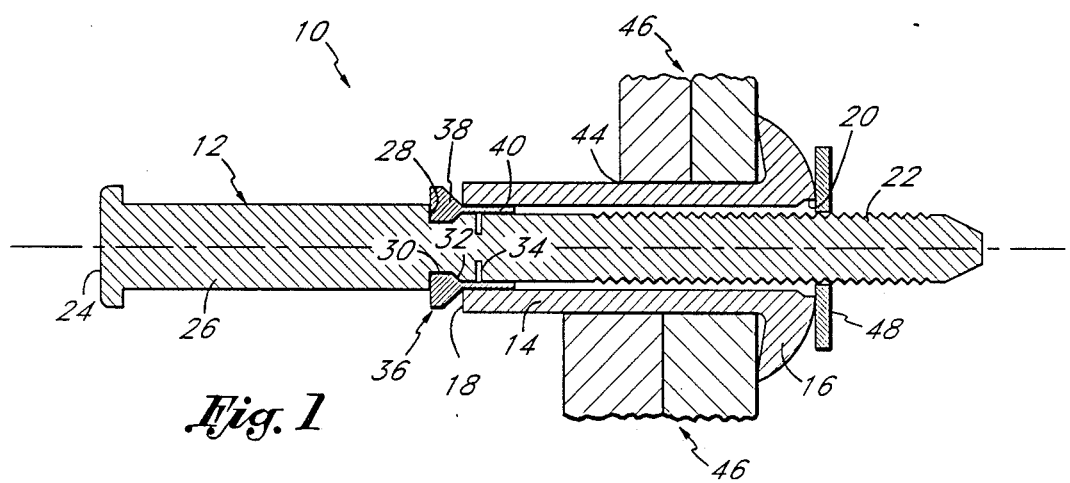
FIG. 1 is a side view of a blind fastener assembly illustrating a preferred embodiment of the present invention.
Figure 2:
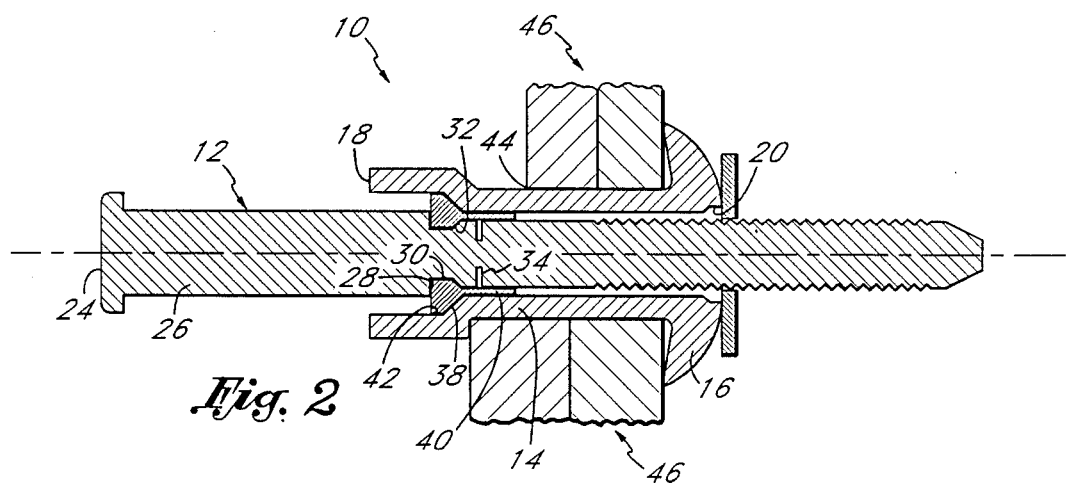
FIG. 2 is a side view of the blind fastener assembly shown in FIG. 1, after having formed a blind head.
Figure 3:
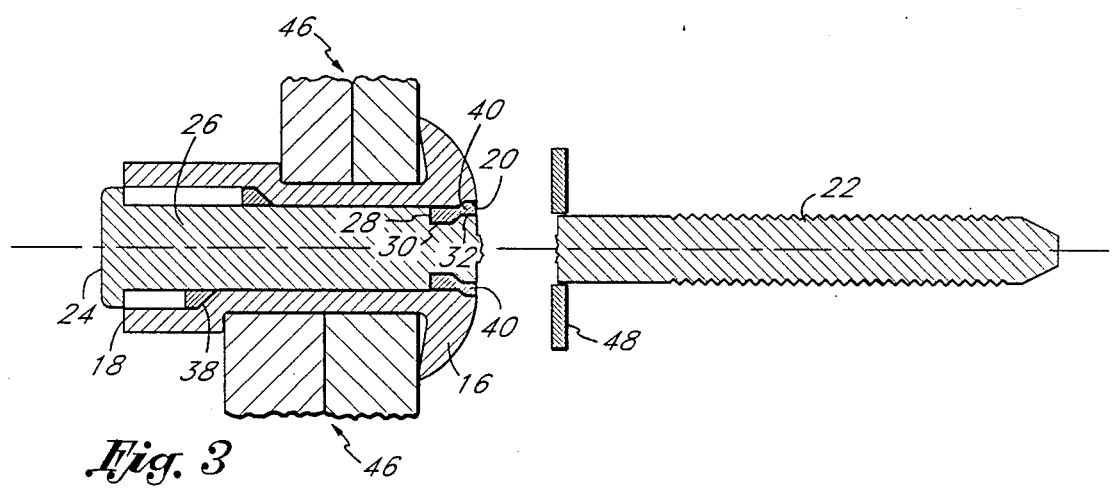
FIG. 3 is a side view of the blind fastener assembly operatively installed within a workpiece.

Referring now to FIG. 1, there is shown generally at 10, a blind fastener embodying the present invention in a preferred form. As illustrated in FIGS. 1-3, the blind fastener 10 comprises an axially elongate mandrel stem 12, extending through a tubular fastener sleeve 14. The tubular fastener sleeve 14 comprises a head portion 16 and a tail portion 18. Adjacent the head portion 16 of the fastener sleeve 14 is a locking recess 20, adapted to receive a locking collar.

The mandrel stem 12 is appreciably longer than the fastener sleeve 14, and exhibits serrations 22 along a substantial length thereof, to facilitate firm engagement by a conventional installation tool (not shown). Opposite the serrated end 22 of the mandrel stem 12 is an enlarged head 24. Adjacent the enlarged head 24 and extending axially toward the serrated end 22 of the mandrel stem 12 is cylindrical neck portion 26, having an outer diameter slightly larger than the inner diameter of the tail end 18 of the sleeve 14, and which terminates in an abrupt shoulder 28.

Adjacent the shoulder 28 of the stem cylindrical neck portion 26 is an annular recess 30. The annular recess 30 is bounded by a radially extending first wall defined by the shoulder 28, and a second, forwardly sloping wall 32, radially shorter than shoulder 28. The height of the sloping wall 32 defines the diameter of the serrated end 22 of the mandrel stem 12. A break groove 34, which is a weakened portion in the mandrel stem 12, is provided proximate to the annular recess 30, so that the break groove 34 is disposed within the fastener sleeve 14, prior to being set.

Fitted within the annular recess 30, adjacent shoulder 28, is an integral shear ring and locking collar unit or assembly 36. This assembly 36 comprises a wedge-shaped bulbing portion 38, extending into an elongate leading lock ring portion 40. The slope of the leading edge of the bulbing portion 38 is about 20° to 50° with respect to the axis of the stem. The wedge-shape bulbing portion 38 has a rectangular trailing edge 42 which abuts the shoulder 28 of the cylindrical neck portion 26. The shoulder 28 limits axial movement of the shear ring and locking collar assembly 36 during the installation process. Preferably, the leading portion 40 extends beyond and surrounds the break groove 34.

Preferably, the integral shear ring and locking collar assembly 36 is formed from a length of shaped wire, suitable for wrapping around the circumference of the stem 12. Although the wire assembly is preferable, a solid (non-slotted) shear ring could be swaged into the groove in the stem. The leading portion 40 is preferably sized so that when wrapped around the mandrel stem 12, it exhibits substantially the same diameter as that of the cylindrical neck portion 26. More preferably, the material from which the integral shear ring and locking collar assembly 36 is formed is selected such that the wedge-shaped bulbing portion 38 shears at a predetermined pulling load.

The blind fastener 10 of the present invention is particularly suited for joining work pieces in which access is convenient from only one side. The drawing figures illustrate a minimum thickness workpiece on one side and a maximum thickness workpiece on the opposite side. In operation, the blind fastener 10 is inserted through a bore 44 in the workpiece 46 so that the head 16 of the fastener sleeve 14 rests on the accessible side of the workpiece 46. The serrated end 22 of the mandrel stem 12 is then engaged by a conventional installation tool (not shown), which pulls the stem 12 axially away from the workpiece 46 while at the same time bears against the head 16 of the fastener sleeve 14.

As the mandrel stem 12 is pulled, the integral shear ring and locking collar assembly 36 is drawn into the tail end 18 of the fastener sleeve 14. As the wedge-shaped portion 38 of the assembly 36 axially compresses and radially expands the tail end 18 of the sleeve 14 to form a blind head, the leading portion 40 expands the smaller diameter portion of the sleeve, filling the space between the bore 44 in the workpiece 46 and the sleeve. After forming the blind head, the wedge-shaped portion 38 shears. Further pull on the stem 12 draws the leading portion 40 and cylindrical neck 26 further into the sleeve 14.

When the leading portion 40 meets with an anvil washer 48, it axially compresses and buckles outwardly into the locking recess 20 formed in the sleeve. The axial buckling of the leading portion 40 uncovers the break groove 34 and, as a final step, the mandrel stem 12 breaks along the break groove 34.

With the arrangement illustrated, the sleeve blind head is essentially formed before the sleeve encounters substantial "hole-fill" forces and thus the required pulling force to bulb the sleeve end is minimized. The sleeve can then be expanded to achieve the desired hole fill as the neck portion 26 is drawn into the sleeve. Elongation of the stem can be minimized or controlled as desired.

Other modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A blind fastener comprising:
   a tubular sleeve having a head and a tail, said sleeve being adapted for insertion through aligned apertures in a plurality of workpieces;
   an elongate mandrel stem having a pulling portion extending through and beyond said sleeve and having an enlarged cylindrical neck portion terminating in a shoulder; and
   an integral shear ring and locking collar assembly, having a sleeve tail bulbing portion and an elongate leading locking collar portion, said integral shear ring and locking collar assembly being disposed on said mandrel stem pulling portion, abutting said shoulder and adapted to cooperate with said mandrel stem to bulb said tail to form a blind head, wherein said bulbing portion is constructed and arranged to shear after forming a blind head in response to a predetermined pulling force.

2. A blind fastener as defined by claim 1, wherein said pulling portion has an outer diameter smaller than that of the inner diameter of said sleeve.

3. A blind fastener as defined by claim 1 wherein said stem further comprises an annular recess, bounded by a radially extending first wall defined by said boulder and a second, forwardly sloping wall.

4. A blind fastener as defined by claim 3, wherein said forwardly sloping wall is radially shorter than said shoulder.

5. A blind fastener, as defined by claim 1, wherein said integral shear ring and locking collar assembly is formed of material which is different from that of said mandrel stem.

6. A blind fastener, as defined by claim 1, wherein said sleeve tail bulbing portion is wedge-shaped.

7. A blind fastener comprising:
a tubular sleeve having a head and a dial, said sleeve being adapted for insertion through aligned apertures in a plurality of workpieces;
an elongate mandrel stem having a pulling portion extending through and beyond said sleeve and having an enlarged cylindrical neck portion terminating in a shoulder; and
an integral shear ring and locking collar assembly, having a wedge-shaped sleeve tail bulbing portion and an elongate leading locking collar portion, said integral shear ring and locking collar assembly being disposed on said mandrel stem pulling portion, abutting said shoulder and adapted to cooperate with said mandrel stem to bulb said tail to form a blind head, wherein said mandrel stem further comprises a break groove which is surrounded by said leading locking collar portion of said integral shear ring and locking collar assembly prior to installation.

8. A blind fastener comprising:
a tubular sleeve having a head and a tail, said sleeve being adapted for insertion through aligned apertures in a plurality of workpieces;
an elongate mandrel stem having a pulling portion extending through and beyond said sleeve and having an enlarged cylindrical neck portion terminating in a shoulder; and
an integral shear ring and locking collar assembly, having a wedge-shaped sleeve tail bulbing portion and an elongate leading locking collar portion, said integral shear ring and locking collar assembly being disposed on said mandrel stem pulling portion, abutting said shoulder and adapted to cooperate with said mandrel stem to bulb said tail to form a blind head, wherein said wedge-shaped bulbing portion is constructed and arranged to shear after forming a blind head in response to a predetermined pulling force.

9. A blind fastener comprising:
a tubular sleeve having a head and a tail, said sleeve being adapted for insertion through aligned apertures in a plurality of workpieces;
an elongate mandrel stem having a pulling portion extending through and beyond said sleeve and having an enlarged cylindrical neck portion terminating in a shoulder; and
an integral shear ring and locking collar assembly, having a wedge-shaped sleeve tail bulbing portion and an elongate leading locking collar portion, said integral shear ring and locking collar assembly being disposed on said mandrel stem pulling portion, abutting said boulder and adapted to cooperate with said mandrel stem to bulb said tail to form a blind head, wherein said wedge-shaped bulbing portion is constructed and arranged to shear after forming a blind head in response to a predetermined pulling force, and wherein said leading locking collar portion is constructed and arranged to continue travelling through said sleeve and buckle into a recess formed in said sleeve after said wedge-shaped bulbing portion shears in response to a predetermined pulling force on said mandrel stem, thereby forming a locking collar.

10. A and fastener comprising:
a tubular sleeve having a head and a tail, said sleeve being adapted for insertion through aligned apertures in a plurality of workpieces;
an elongate mandrel stem having a pulling portion extending through and beyond said sleeve and having an enlarged cylindrical neck portion terminating in a shoulder; and
an integral shear ring and locking collar assembly, having a wedge-shaped sleeve tail bulbing portion and an elongate leading locking collar portion, said integral shear ring and locking collar assembly being disposed on said mandrel stem pulling portion, abutting said shoulder and adapted to cooperate with said mandrel stem to bulb said tail to form a blind head, wherein said wedge-shaped bulbing portion is constructed and arranged to shear after forming a blind head in response to a predetermined pulling force, and wherein said wedge-shaped bulbing portion is disposed at an angle of between 20° and 50° with respect to the axis of said stem.

11. A method of making a blind fastener, comprising the steps of:
forming a step having an enlarged neck portion terminating in a shoulder, recess bounded by said shoulder, and a pulling portion;
providing a sleeve for receiving said stem, said sleeve having a head, a tail and an inner diameter larger than the outer diameter of said pulling portion of said stem;
forming an integral shear ring and locking collar assembly having a leading locking collar portion and a bulbing portion constructed and arranged to shear after forming a blind head in response to a predetermined pulling force; and
positioning a portion of said assembly in said recess so that said leading locking collar portion faces said tail of said sleeve and said wedge-shaped bulbing portion extends radially beyond said stem.

12. The method of claim 11, wherein said bulbing portion is wedge-shaped.

13. A method of making a blind fastener, comprising the steps of:
forming a stem having an enlarged neck portion terminating in a shoulder, a recess bounded by said shoulder, and a pulling portion;
providing a sleeve for receiving said stem, said sleeve having a head, a tail and an inner diameter large than the outer diameter of said pulling portion of said stem;

forming an integral shear ring and locking collar assembly having a leading locking collar portion and a wedge-shaped bulbing portion; and positioning a portion of said assembly in said recess so that said leading locking collar portion faces said tail of said sleeve and said wedge-shaped bulbing portion extends radially beyond said stem, wherein said forming and positioning steps include forming said assembly from a coil of shaped wire, and wrapping said wire into said recess.

14. A method of setting a blind fastener in a workpiece in which only one side is accessible, comprising the steps of:

providing a blind fastener comprising a sleeve, a stem extending through said sleeve and an integral shear ring and locking collar assembly;

forming aligned apertures in said workpiece;

inserting said blind fastener into said aligned apertures so that a head portion of said sleeve rests on said accessible side of said workpiece;

pulling said stem axially away from said accessible side of said workpiece, thereby forcing said integral shear ring and locking collar assembly into said sleeve to form a blind head, wherein a shear ring portion of said assembly shears after having formed said blind head and wherein a locking collar portion of said assembly buckles outwardly into a locking recess in said sleeve in response to further axial pulling of said stem.

* * * * *